United States Patent [19]
Batten

[11] Patent Number: 5,405,538
[45] Date of Patent: Apr. 11, 1995

[54] IMMISCIBLE LIQUIDS SEPARATOR

[75] Inventor: William C. Batten, Asheboro, N.C.

[73] Assignee: Clearline Systems, Inc., Asheboro, N.C.

[21] Appl. No.: 178,651

[22] Filed: Jan. 7, 1994

[51] Int. Cl.⁶ ............................................. C02F 1/40
[52] U.S. Cl. ............................ 210/744; 210/800; 210/104; 210/522; 210/540
[58] Field of Search .......... 210/106, 110, 115, 242.1, 210/242.3, 257.1, 258, 259, 262, 519, 521, 532.1, 538, 540, 744, 800, 803, 522

[56] References Cited

U.S. PATENT DOCUMENTS

| | | | |
|---|---|---|---|
| 1,200,951 | 10/1916 | Kelly, Jr. | 210/540 |
| 2,747,736 | 5/1956 | Mobley | 210/540 |
| 2,776,054 | 1/1957 | Hirshstein | 210/540 |
| 2,894,631 | 2/1959 | Levit et al. | 210/152 |
| 3,762,548 | 10/1973 | McCabe | 210/540 |
| 3,769,207 | 10/1973 | Baer | 210/44 |
| 4,108,773 | 8/1978 | Macaluso | 210/242.3 |
| 4,119,541 | 10/1978 | Makaya | 210/242 |
| 4,132,645 | 1/1979 | Bottomley et al. | 210/540 |
| 4,356,086 | 10/1982 | Oberg | 210/242.3 |
| 4,376,702 | 3/1983 | Small | 210/201 |
| 4,400,274 | 8/1983 | Protos | 210/302 |
| 4,428,841 | 1/1984 | Favret, Jr. | 210/540 |
| 4,915,823 | 4/1990 | Hall | 210/95 |
| 5,108,591 | 4/1992 | Hagan | 210/242.3 |
| 5,236,585 | 8/1993 | Fink | 210/242 |

FOREIGN PATENT DOCUMENTS 55-45293 11/1980 Japan .

Primary Examiner—Christopher Upton
Attorney, Agent, or Firm—Rhodes, Coats & Bennett

[57] ABSTRACT

An apparatus for removing grease from a grease trap separator containing grease and water and transferring the grease to a remote location includes an enclosed transfer tank, a first transport tube having an inlet end positioned to contact the grease in the grease trap separator and an outlet end extending into the tank, a second transport tube having an inlet end positioned to contact the water in the grease trap separator and an outlet end extending to the tank, a transport means arranged to convey the water through the second transport tube between the tank and the grease trap separator, a discharge pipe extending from the tank to a remote location, a first sensor for determining when the tank is filled with grease, and a second sensor for determining when the tank is filled with water, the first and second sensors controlling the action of the transport means.

15 Claims, 4 Drawing Sheets

IMMISCIBLE LIQUIDS SEPARATOR

BACKGROUND OF THE INVENTION

This invention relates to a method and apparatus for separating two immiscible liquids, for example, kitchen effluent comprised of a mixture of grease and water.

Kitchen effluent generated during food processing is normally collected in a grease trap separator, which is commonly a rectangular tank made of precast concrete, buried below grade. In the separator, the grease, being of a lower density than the water, rises to the top, forming a separate grease mat layer. Periodically, the grease is removed from the trap, normally with a vacuum pump. The grease may then be disposed of in a landfill or sold to processors, or rendering companies, for conversion into useful products.

Processing of the grease into useful products is obviously preferred to dumping of the grease into a landfill, which also may not be possible due to increased environmental regulations. Processors, however, are not always willing to accept grease if it includes a significant percentage of water, i.e., more than 15%, because of the increased difficulty in processing. Moreover, the prolonged contact of water with the grease tends to make the grease rancid as a result of the break down of lipids into shorter chain fatty acids, thus decreasing the value of the grease.

The prior art discloses various methods and apparatus for separating two immiscible liquids, and also discloses various methods and apparatus for removing one liquid from contact with the other after separation of the liquids into two layers in a separator. For example, in some cases, the lighter liquid is discharged by gravity from the separator through an upper pipe and the heavier liquid is discharged from the separator through a lower pipe. Generally, the methods and apparatus relate to the separation of grease or oil from water.

U.S. Pat. No. 2,747,736 to Mobley describes a device for removing grease from waste water in a separator, in which grease which floats to the top of the separator is removed by hydrostatic forces. The grease is then stored at a collecting and storage point remote from the separator.

U.S. Pat. No. 5,236,585 to Fink describes an apparatus comprised of a separator in which oil and water are separated. The oil, which floats to the top of the water, flows under gravity to a second separator, where remaining oil is removed, e.g., by filtration. Water is removed from the bottom of the first separator.

Other patents show similar devices. U.S. Pat. No. 4,915,823 to Hall, describes a device for separating oil from water in bilge discharges. After separation, the oil and water are removed through separate discharge pipes. U.S. Pat. No. 4,119,541 to Makaya, discloses a similar arrangement for cleaning up oil spills by separating oil from sea water. U.S. Pat. No. 4,400,274 to Protos, describes a gravity separator in which solids are removed prior to separation of the grease and water.

SUMMARY OF THE INVENTION

The present invention, while having as its objective the removal of a first liquid from a second liquid in a separator and transfer of the first liquid to a remote location, provides for the removal and transfer by a propulsion means which withdraws the first liquid from the separator and then discharges it to a remote location.

The current invention is particularly useful in retrofitting existing separators, many of which are located below grade. After modification with the present invention, the first liquid, e.g., grease, can be periodically and automatically removed from the second immiscible liquid, e.g., water, and transported to a remote location for storage and subsequent collection.

While the invention is described in terms of the separation of grease from water, it will be apparent that the apparatus and method described herein are generally useful in the separation of two immiscible liquids.

The apparatus of the present invention is comprised of an enclosed transfer tank, i.e., a container which is capable of holding a vacuum, a first transfer tube extending from the separator to the tank, a discharge pipe extending from the container to a remote location, and propulsion means for withdrawing grease from the separator through the first transfer tube and into the tank, and thereafter discharging the grease from the container through the discharge pipe.

The first transfer tube may specifically be a tube having an inlet positioned to contact a grease mat layer in the separator and an outlet within the container. A check valve or other means can be located within the first first transfer tube to prevent grease from flowing back into the separator. The discharge pipe may also contain a check valve or other means to prevent grease from flowing back into the container.

The propulsion means may be comprised of a second transfer tube having one end in communication with the container and a second end in the separator positioned to contact the water, and a transport means, such as a pump, for moving water through the tube between the container and the separator.

Preferably, the propulsion means is controlled by a control means whereby the propulsion means draws grease into the container until the container is filled, and then automatically discharges the grease from the container. The control means may be comprised of sensors which detect when the container is emptied or filled, and signal the propulsion means to control the direction of flow of water in the second transfer tube.

In the preferred method of operation, grease is withdrawn from the grease trap separator to the transfer tank, which serves as an intermediate transfer area. After the tank is filled, the grease is discharged from the container to a remote location. In the preferred embodiment, water will first be withdrawn from the container to the separator, creating a vacuum within the tank which will draw the grease into the tank, and then water will be reintroduced into the container to propel the grease from the tank through the discharge pipe.

For automatic operation, the method will include sensing when the container is filled with, or empty of, grease, and controlling the flow of water in response to the presence or absence of grease in the container.

In the preferred method of automatic operation, water is pumped through a tube from the container into the separator, creating a vacuum in the container, which draws grease from the separator into the container. When the container is filled, a sensor detects that the container is filled and reverses the flow of water so that water then flows from the separator into the container, propelling the grease from the container to a remote location. Flow of grease back into the separator is prevented.

DETAILED DESCRIPTION OF THE PREFERRED EMBODIMENT

Figure 1:
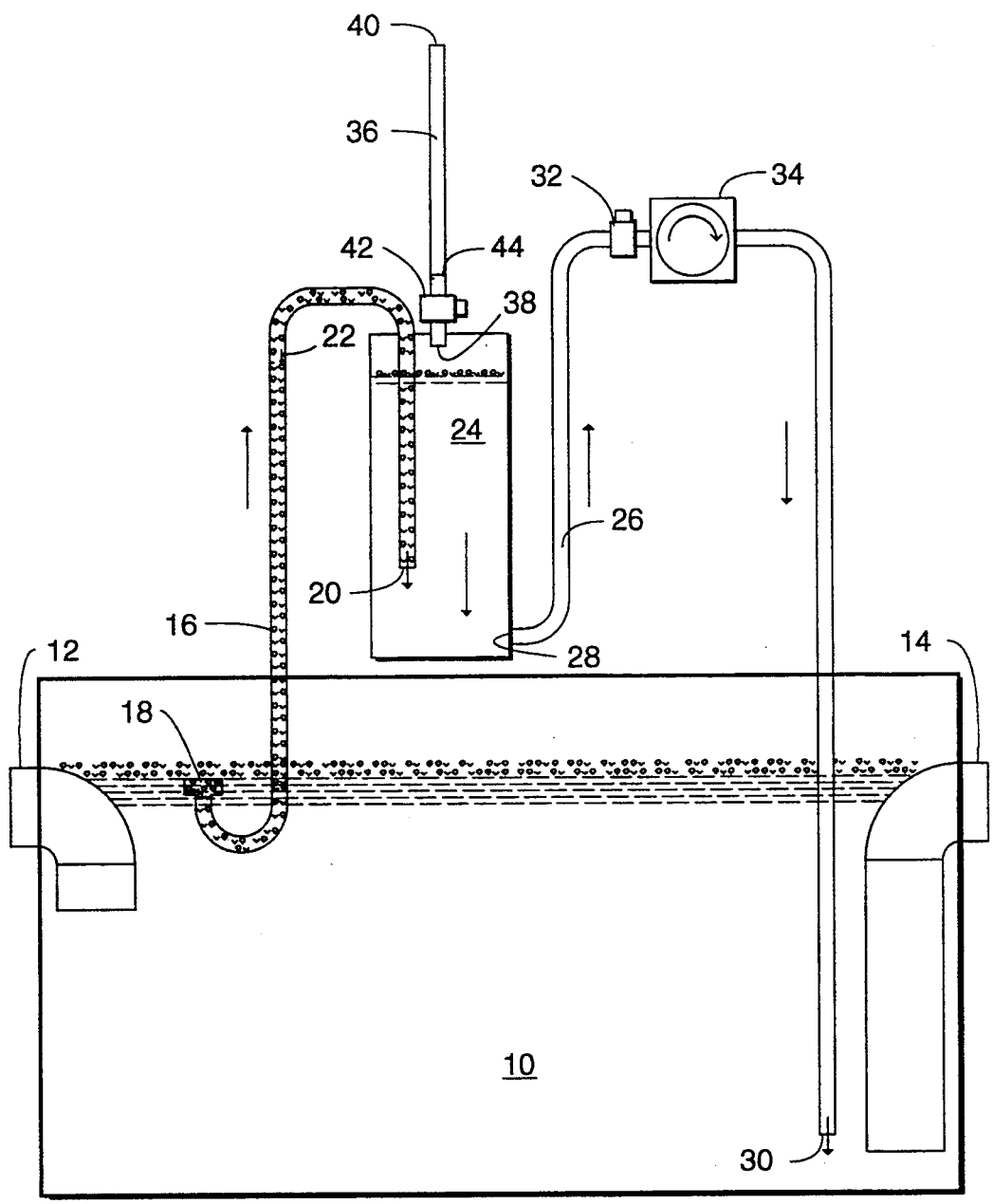
FIG. 1 is a sectional, schematic view of the apparatus of the present invention showing filling of the transport tank with grease.

FIGS. 1–4 illustrate the preferred embodiment of the present invention in association with a conventional grease trap separator 10 containing a mixture of grease and water provided with an inlet pipe 12 and a discharge pipe 14. As is conventional with grease traps and other holding tanks holding a mixture of immiscible liquids, the lighter liquid "floats" on top of the heavier, or denser, liquid. Thus grease in a grease trap forms a grease mat. As used herein "grease" may include oils and other lighter than water liquids commonly found in grease traps.

The preferred apparatus is comprised of a grease transfer tube 16 positioned with an inlet end 18 in contact with the grease mat layer within separator 10, and a discharge end 20. A check valve 22 prevents flow of grease through tube 16 back into separator 10. Discharge end 20 is positioned within a sealed transfer tank 24. Transfer tank 24 can be constructed of a variety of materials, e.g., steel or fiberglass, so long as it can withstand the pressures exerted by the water and grease within the tank and the vacuum created when water is withdrawn from the tank. The shape of tank 24 is not critical, but preferably the walls are vertical and smooth to facilitate flow of the grease. Also, a vertical elongation of the tank 24 permits maintenance of a clear demarcation between the two liquids it is to hold.

A water transfer tube 26 extends from an opening 28 near the bottom of transfer tank 24 down into tank 10 and has a second terminal end 30 opening near the bottom of tank 10. A sensor 32 is positioned to detect flow of material within tube 26. Sensor 32 is of a type commercially available and its selection can be readily made by one skilled in the art. Sensor 32 can detect changes in the density of material passing through tube 26, and respond to changes by sending a signal. In this way, sensor 32 can detect which liquid is passing at any given time.

A pump 34 is in communication with tube 26 and with sensor 32. Pump 32 is capable of reversing direction, and thus can transport material through tube 26 in either direction in response to a signal from sensor 32. It will be apparent that arrangements other than this type of pump can be used to obtain the reversible flow. For example, two pumps can be use in parallel, with the sensor controlling which pump is in operation. Any such suitable transport means can be used.

A grease discharge pipe 36 extends from an inlet end 38 at transfer tank 24 to an outlet end 40 which can be attached to a remote location, e.g., a truck tank or holding tank. A second sensor 42, like sensor 32, is positioned to detect movement of material in pipe 36 and respond to changes in material density. A check valve 44 is positioned in pipe 36 allowing movement of material only through pipe 36 away from transfer tank 24.

Transfer tank 24 is filled with water before beginning the operation of the apparatus. As illustrated in FIG. 1, pump 34 is then started, to pump water from transfer tank 24 and move the water through 26 into tank 10. The vacuum created by removal of water from transfer tank 24, draws grease into inlet 18, through grease transfer tube 16, out of outlet 20 and into transfer tank 24. The vacuum in transfer tank 24 holds check valve 22 in an open position and check valve 44 in a closed position.

Figure 2:
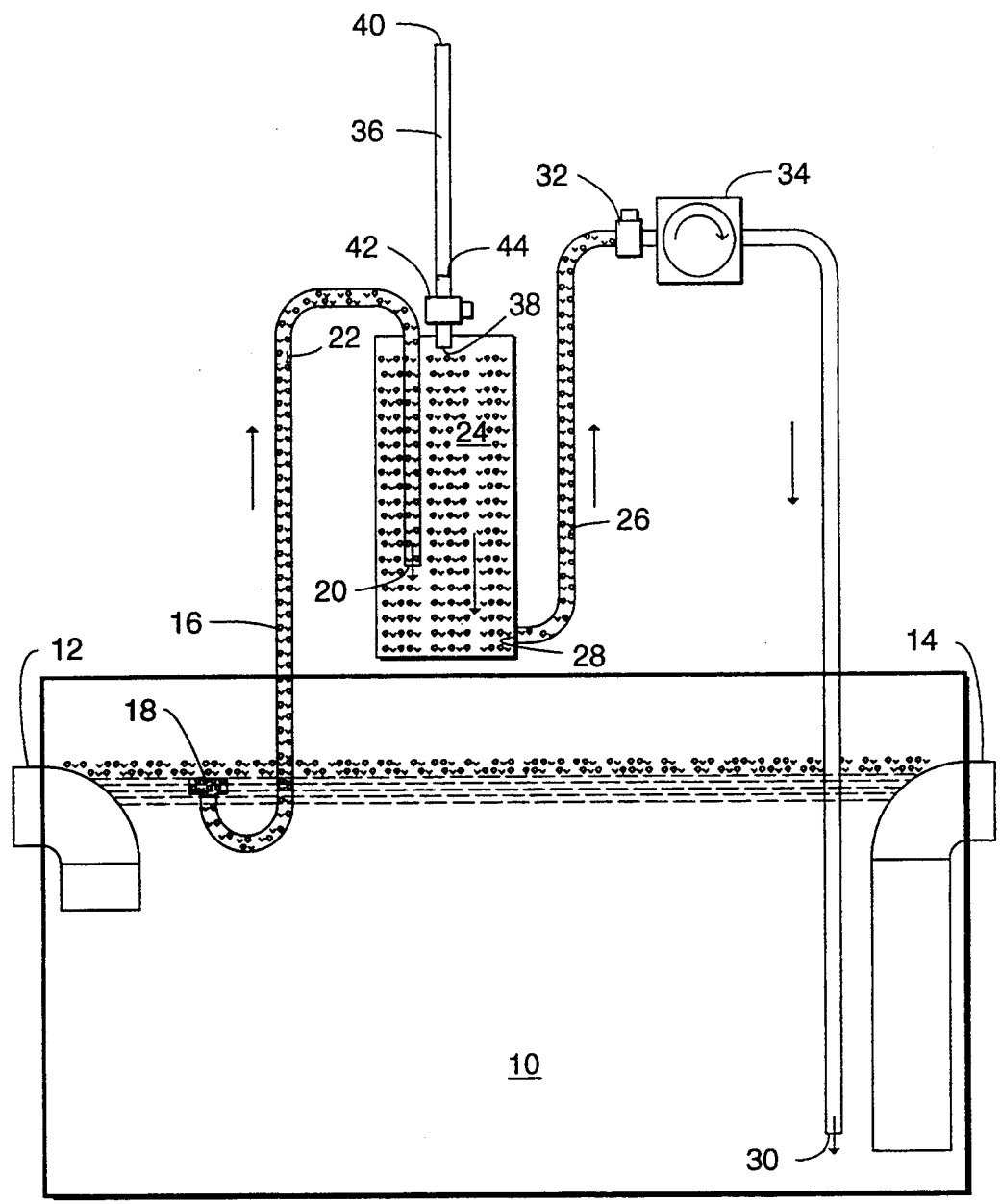
FIG. 2 is a sectional, schematic view of the apparatus showing the transport tank filled with grease immediately prior to flow reversal.

When grease fills transfer tank 24 and enters water transfer tube 26, as shown in FIG. 2, sensor 32 detects the change in density of the material in transfer tube 26 and signals pump 34 to reverse direction.

Figure 3:
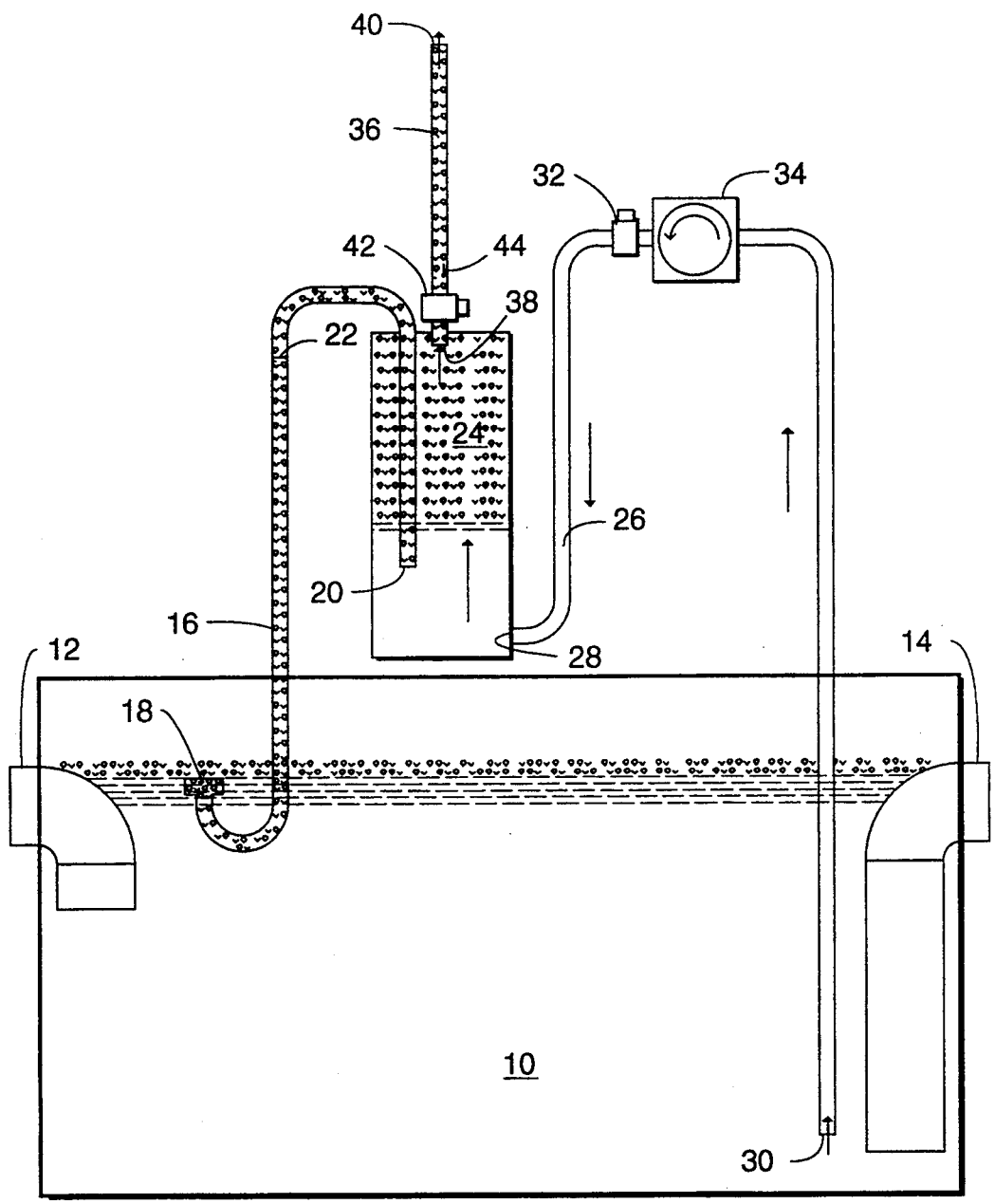
FIG. 3 is a sectional, schematic view of the apparatus showing discharge of grease from the transport tank.
Figure 4:
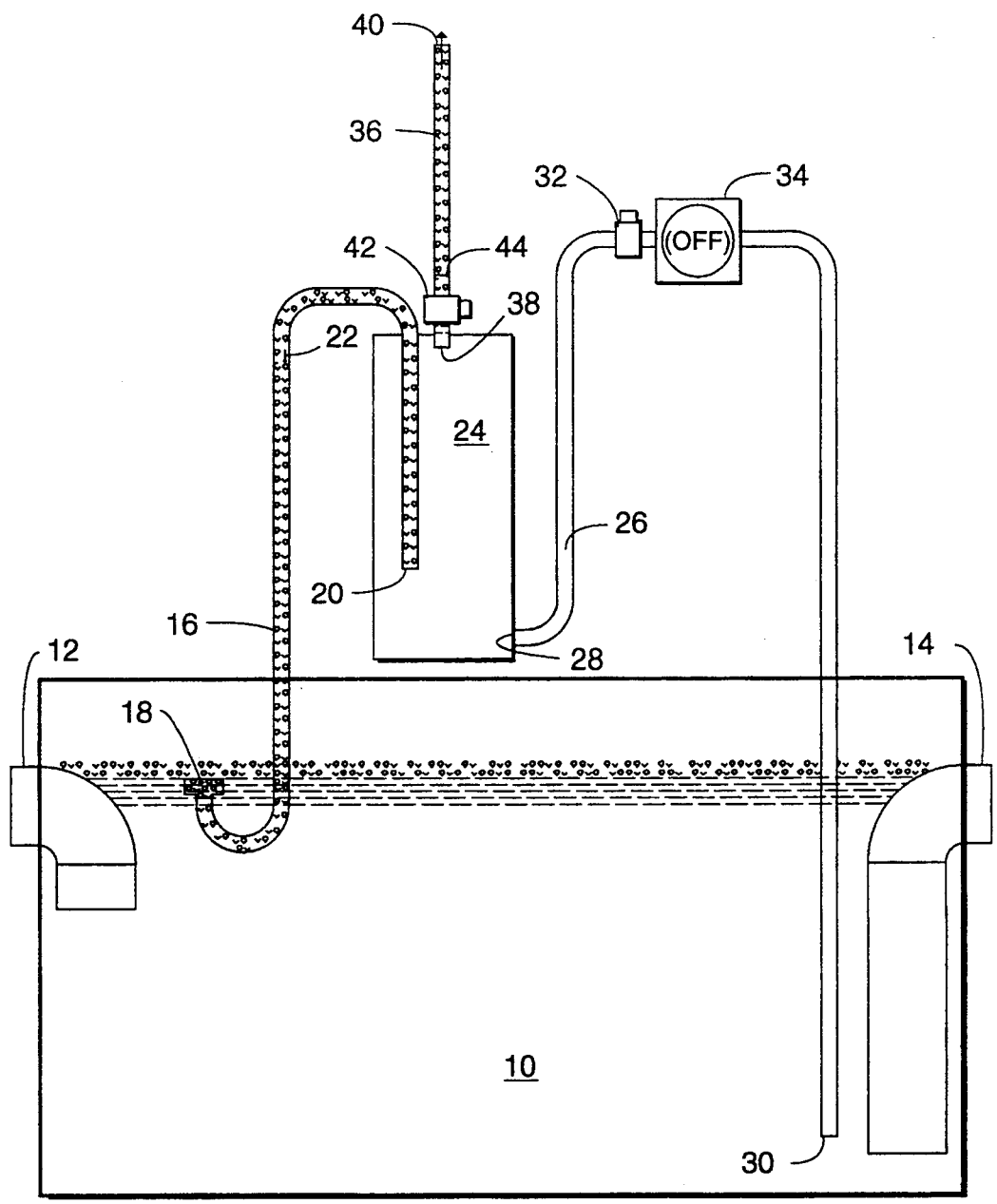
FIG. 4 is a sectional, schematic view of the apparatus at the end of the grease discharge stage.

As illustrated in FIG. 3, pump 34 than begins to draw water from tank 10 and move the water through transfer tube 26 into transfer tank 24. The pressure created in transfer tank 24 closes check valve 22 and opens check valve 44. Grease then is forced out of transfer tank 24 through inlet 38 and discharged to a holding tank or the like through grease discharge pipe 36.

After the grease has been discharged from transfer tank 24, water starts to enter grease discharge pipe 36 and is detected by sensor 42 which stops pump 34, readying the system for the next cycle.

Several advantages of the above apparatus over devices described in the prior art, including the following, will be readily apparent. Grease and oils do not pass through the pump, and gross solids are transported without passing through the pump. Fewer operating steps are involved in separating the grease from the waste water and transporting it to a dedicated storage container. The preferred apparatus does not include a trough, wiper blades or other apparatus subject to being clogged by build-up of solids particles. The apparatus permits easy retrofitting of thousands of existing inground grease traps, upgrading such traps to automatic, self-servicing entities.

It is to be understood that many modifications and variations of the described invention can be made without departing from the spirit and scope thereof.

What is claimed is:

1. An apparatus for removing a lighter density first liquid from a grease trap separator holding said first liquid and a heavier density second liquid with which the first liquid is immiscible and transferring said first liquid to a remote location comprising a tank, a first transfer tube having an inlet end positioned to contact said first liquid in the grease trap separator and an outlet end extending into the tank, a discharge pipe extending from said tank to a remote location, and propulsion means for withdrawing said first liquid from said grease trap separator through said first transfer tube and into said tank and thereafter discharging said first liquid from said tank through said discharge pipe by pumping said second liquid into said tank from a lower part of said grease trap separator.

2. The apparatus of claim 1, wherein said propulsion means is comprised of a second transfer tube having an inlet end positioned to contact said second liquid in said grease trap separator and an outlet end extending to said tank, and transport means for conveying said second liquid through said second transfer tube between said tank and said grease trap separator.

3. The apparatus of claim 2, further comprising a control for controlling the direction of flow of liquid in said second transfer tube.

4. The apparatus of claim 3, wherein said control is comprised of a first sensor for determining when said tank is filled with said first liquid, and a second sensor for determining when said tank is filled with said second liquid, said first and second sensors being connected to said transport means.

5. The apparatus of claim 4, wherein said transport means is a reversible pump.

6. An apparatus as claimed in claim 1 further comprising density detectors associated with said tank to measure the density of liquids to detect when said tank is full of said first liquid or said second liquid and outputting detection signals to control said propulsion means.

7. An apparatus as claimed in claim 1 further comprising a check valve in said discharge pipe to permit discharge of said first liquid, but no return flow.

8. An apparatus for removing a lighter density first liquid from a heavier density second liquid in a grease trap separator in which the liquids separate and transferring the first liquid to a remote location comprising
an enclosed transfer tank,
a first transfer tube having an inlet end positioned to contact said first liquid in said grease trap separator and an outlet end extending into said tank,
a second transfer tube having an inlet end positioned to contact said second liquid in a lower portion of said grease trap separator and an outlet end extending into said tank,
transport means for conveying said second liquid through said second transfer tube between said tank and said grease trap separator, and
a discharge pipe extending from said container to a remote location.

9. The apparatus of claim 8, further comprising a first sensor for determining when said tank is filled with said first liquid, and a second sensor for determining when said tank is filled with said second liquid, said first and second sensors being connected to said transport means.

10. The apparatus of claim 9, wherein said transport means is a reversible pump.

11. The apparatus of claim 8, further comprising a first flow prevention means for preventing the flow of said first liquid through said first transfer tube from said tank to said grease trap separator, and second flow prevention means for preventing the flow of said first liquid from said discharge pipe into said tank.

12. An apparatus for removing grease from a grease trap separator containing grease and water and transferring said grease to a remote location comprising
an enclosed transfer tank, a first transport tube having an inlet end positioned to contact said grease in said grease trap separator and an outlet end extending into said tank,
a second transport tube having an inlet end positioned to contact said water in said grease trap separator and an outlet end extending to said tank,
a transport means arranged to convey said water through said second transport tube between said tank and said grease trap separator,
a discharge pipe extending from said tank to a remote location,
a first sensor for determining when said tank is filled with grease, and
a second sensor for determining when said tank is filled with water, said first and second sensors controlling the action of said transport means.

13. A method for removing a lighter density first liquid from a heavier density second liquid in a grease trap separator and transferring said first liquid to a remote location comprising
establishing an enclosed intermediate transfer area containing said second liquid,
transferring said second liquid from said area to said grease trap separator while transferring said first liquid from said separator to said area, and
thereafter transferring said second liquid from said grease trap separator to said area while discharging said first liquid from said area to a remote location.

14. The method of claim 13, further comprising the steps of sensing when said area is filled with said second liquid and thereafter performing said first transferring step and subsequently sensing when said area is filled with said first liquid, followed by said second transferring step.

15. The method of claim 13, wherein said first liquid is grease and said second liquid is water.

* * * * *